R. PINDER.
REVERSIBLE CLUTCH.
APPLICATION FILED NOV. 23, 1920.

1,427,168.

Patented Aug. 29, 1922.

Inventor:
Rudolph Pinder.
by his atty.

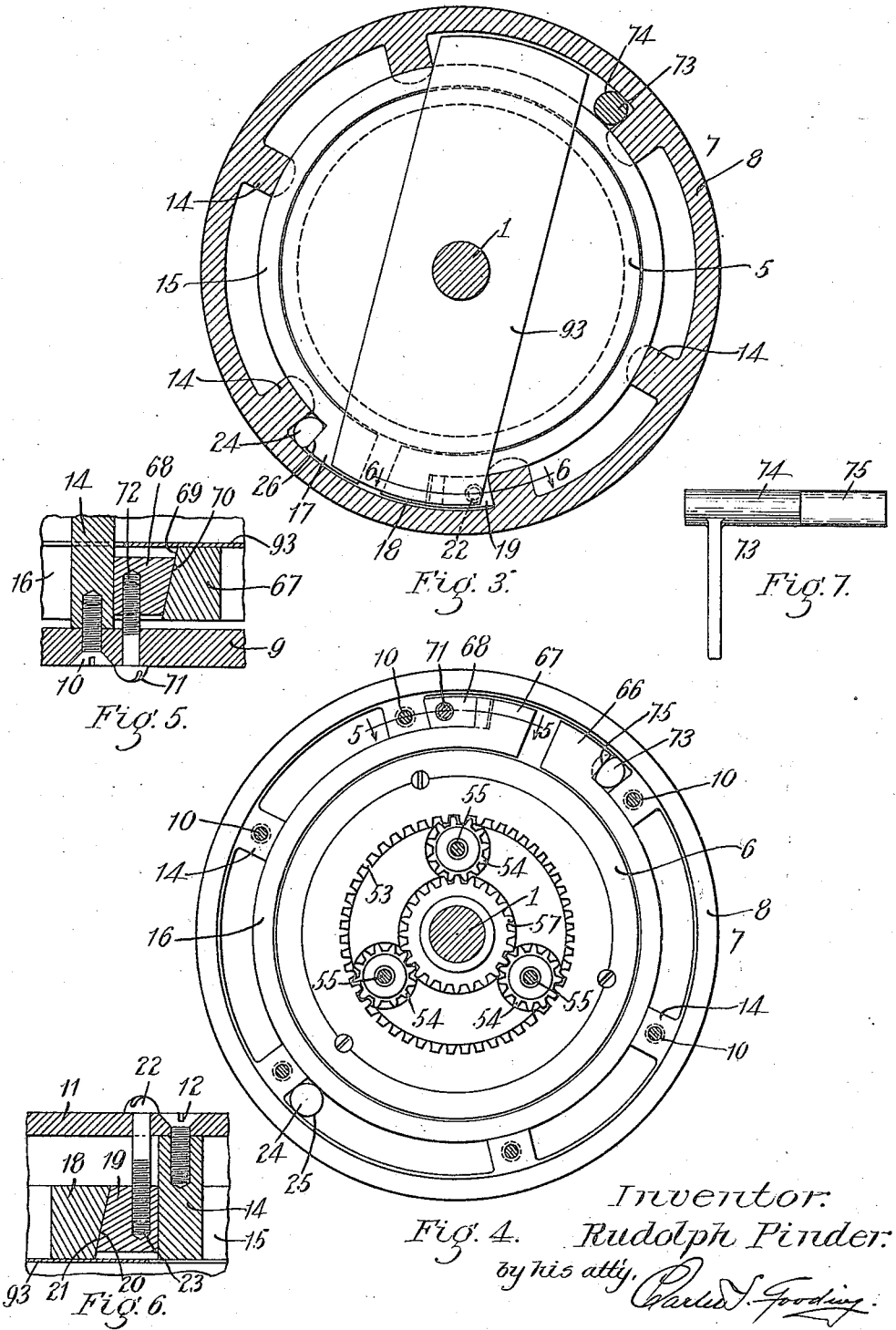

UNITED STATES PATENT OFFICE.

RUDOLPH PINDER, OF MEDFORD, MASSACHUSETTS.

REVERSIBLE CLUTCH.

1,427,168.   Specification of Letters Patent.   Patented Aug. 29, 1922.

Application filed November 23, 1920. Serial No. 426,030.

*To all whom it may concern:*

Be it known that I, RUDOLPH PINDER, a citizen of the United States, residing at Medford, in the county of Middlesex and State of Massachusetts, have invented new and useful Improvements in Reversible Clutches, of which the following is a specification.

This invention relates to a reversible friction clutch and has for its object to provide a simple and efficient mechanism by means of which a driving member and a driven member normally disconnected may be coupled together in order that the driving member may rotate the driven member in either a forward or a reverse direction as desired.

The invention consists in the combination and arrangement of parts set forth in the following specification and particularly pointed out in the claims thereof.

Referring to the drawings:

Fig. 3 is a transverse section taken on the line 3—3 of Fig. 1, looking toward the left in said figure.

Fig. 4 is a transverse section taken on the line 4—4 of Fig. 1, also looking toward the left in said figure.

Fig. 5 is a detail section taken on the line 5—5 of Fig. 4.

Fig. 6 is a detail section taken on the line 6—6 of Fig. 3.

Fig. 7 is a side elevation of one of the cam bars.

Like numerals refer to like parts throughout the several views of the drawings.

Figure 1:
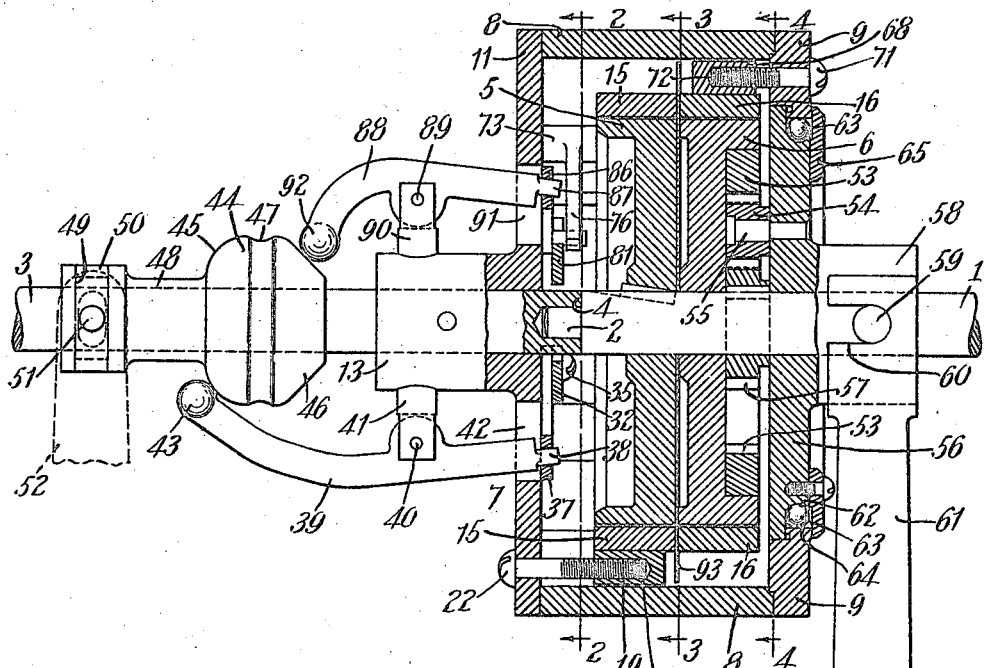
Figure 1 represents a clutch mechanism embodying my invention, the same being illustrated partly in side elevation, and partly in longitudinal section.

In the drawings, 1 represents a driving shaft which may be connected with and driven by any suitable source of motive power. The diameter of the shaft 1 is reduced at the end thereof at 2 and said reduced end is inserted within the adjacent end of a shaft 3 which is in longitudinal alignment with the shaft 1 and which abuts against a shoulder 4 formed upon the shaft 1. The shaft 3 constitutes the driven shaft. 5 and 6 are cylindrical clutch members mounted upon the driving shaft 1, the member 5 being fast to said shaft and rotatable therewith, while the member 6 is loose upon said shaft and rotatable thereon.

Figure 2:
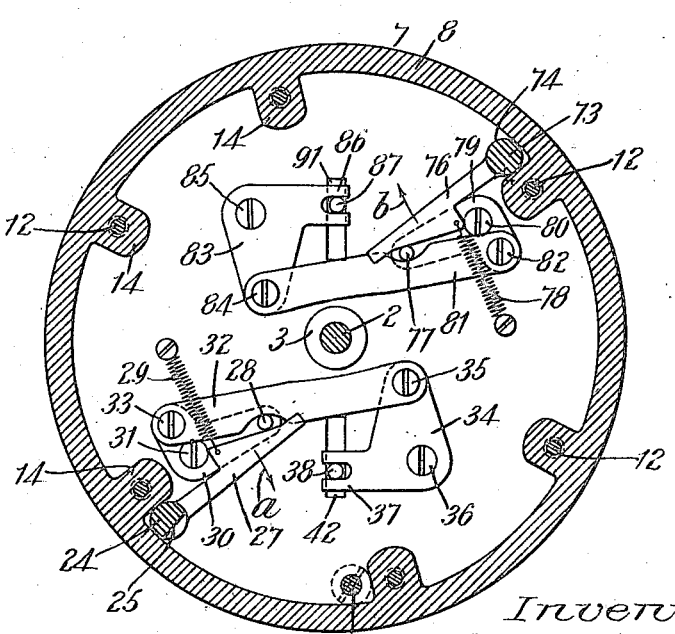
Fig. 2 is a transverse section taken on the line 2—2 of Fig. 1, looking toward the left in said figure.

Fast to the shaft 3 to always rotate therewith is another clutch member 7 which consists of a casing embodying therein a concentrically arranged cylindrical portion 8 having an annular bearing ring 9 fast thereto at one end thereof by screws 10 and a solid wall 11 at the opposite end thereof which is fast thereto by screws 12, the said wall having a hub 13 formed integral therewith which is suitably fastened to the shaft 3. The cylindrical portion 8 has a plurality of ribs 14 formed integral therewith which extend from the inner surface thereof inward radially a short distance as illustrated in Figures 2, 3 and 4.

Surrounding the clutch members 5 and 6 are clutch rings 15 and 16 respectively each consisting of a resilient split band which substantially encircles the clutch member located therein. The clutch rings have a normal tendency to expand into engagement with the inner surface of the ribs 14 so that normally said rings are entirely disengaged from their respective clutch members, being separated therefrom, however, by a very narrow space. The clutch ring 15 has lugs 17 and 18 which project outwardly therefrom into the space between two adjacent ribs 14 of the clutch member 7. A wedge block 19 is located between the lug 18 and the adjacent rib 14 as illustrated in Figures 3 and 6 filling the space therebetween, an inclined surface 20 of the lug 18 bearing against a correspondingly inclined surface 21 of the wedge block 19, and the opposite side of said wedge block bearing against the side of the rib 14. The relative position of the lug 18 may be varied by moving the wedge block 19 longitudinally by means of a screw 22 which extends through the wall 11 of the clutch member 7, and into a screw-threaded hole 23 provided in the wedge block. The lug 17 at the other end of the clutch ring 15 is separated a short distance from its adjacent rib 14 and in the space thus provided is located a cam bar 24 which extends the length of the rib, being cylindrical for a portion of its length at 25, while the portion which contacts with the lug is flattened at 26. The cam bar 24 is adapted to be rocked to move the lug 17 in a direction away from the adjacent rib 14 and such movement results in contracting the clutch ring 15 to cause it to grip the clutch member 5.

The mechanism for rocking the cam bar 24 is as follows: Referring particularly to Figure 2, the cam bar 24 is provided adjacent to one end thereof with an arm 27 which extends inwardly being always held in contact with a pin 28 by means of a spring 29. The pin 28 is carried by a bell crank lever 30 which is pivoted at 31 to the inner surface of the wall 11 of the clutch member 7. A link 32 fastened to the bell crank lever 30 at 33 contacts with another bell crank lever 34 at 35. The bell crank lever 34 is pivoted to the inner surface of the wall 11 at 36 and one of the arms thereof is forked at 37 to receive the end 38 of a lever 39 which is pivotally mounted at 40 upon a stud 41 which projects outwardly from the hub 13. A lever 39 projects through a slot 42 provided in the wall 11. The outer extremity 43 of the lever 39 is spherical and located in a position to be engaged by a cam 44 which is loosely mounted upon the shaft 3, being also adapted to slide longitudinally thereon. The cam 44 is formed with a rounded surface 45 at one end thereof and a conical surface 46 at the other end thereof, there being a shallow circumferential groove 47 extending around the periphery of the cam intermediate said rounded and conical surface. The cam 44 has a hub portion 48 formed integral therewith which is increased slightly in diameter adjacent to its outer extremity and has a circumferential groove 49 formed therein adapted to receive a split collar 50 which is loosely mounted therein and provided with pins 51 projecting from the opposite sides thereof adapted to project into slots provided in a lever 52 of any suitable construction which is employed to control the longitudinal movement of the cam 44 on the shaft 3.

In Figure 1 the cam 44 is illustrated in its neutral position at which time the shaft 3 is uncoupled from the driving shaft 1. By moving the cam 44 toward the left until the spherical end 43 of the lever 39 is located in the groove 47 of the cam 44 the lever 39 will be rocked upon its pivot 40 and the motion therefrom will be transmitted through the bell crank lever 34, link 32 and bell crank lever 30 to the arm 27 of the cam bar 24 which will be rocked in the direction of the arrow $a$ in Figure 2, causing the clutch ring 15 to grip the clutch member 5 and thereafter cause the clutch members 5 and 7 to rotate in unison, whereupon the shafts 3 and 1 will also rotate in unison.

The mechanism for reversing the rotation of the driven shaft 3 and at the same time reducing the speed thereof is as follows: Fast to the clutch member 6 is an internal gear 53 having spirally arranged teeth. The gear 53 meshes with and is driven by a plurality of intermediate spiral gears 54 which are each rotatably mounted upon studs 55 fast to and projecting from the inner wall of a bearing member 56 which co-operates with the bearing ring 9 in forming a support for one end of the outer clutch member 7. The spiral gears 54 each mesh with and are driven by a spiral gear 57 which is fast to the shaft 1. The ratio of the gearing illustrated is such as to reduce the speed transmitted from the shaft 1 to the clutch member 6 about one-half, although the proportions may be varied if desired. The member 56 is loosely mounted upon the shaft 1 and has a hub 58 formed integral therewith having a pair of oppositely disposed pins 59 extending therefrom which project into slots 60 provided in the opposite ends of a bracket 61 which is located adjacent to and partly surrounds the hub 58, the said bracket being provided for the purpose of preventing the rotation of the bearing member 56 during the rotation of the shaft 1.

To facilitate the rotation of the bearing ring 9 a ball bearing is provided therebetween, the bearing member 56 having an annular ball race 62 extending around the periphery thereof adapted to receive a plurality of balls 63 which also contact with a bearing surface 64 provided upon the bearing ring 9. A retaining ring 65 fast to the bearing member 56 holds the bearing ring 9 and the bearing member 56 in proper relation to each other.

The clutch ring 16 has lugs 66 and 67 which project outwardly therefrom into a space between two adjacent ribs 14 of the clutch member 7, the said space and ribs being oppositely disposed to the space and ribs previously mentioned in connection with the lugs 17 and 18 of the clutch ring 15. A wedge block 68 is located between the lug 67 and the adjacent rib 14 as illustrated in Figures 4 and 5, filling the space therebetween, an inclined surface 29 of the lug 67 bearing against a correspondingly inclined surface 70 of the wedge block 68, and the opposite side of said wedge block bearing against the side of the adjacent rib 14. The relative position of the lug 67 may be varied by moving the wedge block 68 longitudinally by means of a screw 71 which extends through the bearing ring 9 of the clutch member 7 and into a screw-threaded hole 72 provided in said wedge block. The lug 66 at the other end of the clutch ring 16 is separated a short distance from its adjacent rib 14 and in the space thus provided is located a cam bar 73 illustrated in detail in Figure 7 which extends the length of the rib being cylindrical for a portion of its length at 74, the portion, however, which contacts with the lug 66 being flattened at 73. The cam bars 24 and 73 differ only in the relative position of the flattened surfaces located thereon. The cam bar 73 is adapted to be rocked to move the lug 66 in a direction away from the adjacent rib 25, and such movement results in contracting the clutch ring 16 to cause it to grip the clutch member 6.

The mechanism for rocking the cam bar 73 is as follows:—Referring particularly to Figure 2, the cam bar 73 is provided adjacent to one end thereof with an arm 76 which extends inwardly being always held in contact with a pin 77 by means of a spring 78. The pin 77 is carried by a bell crank lever 79 which is pivoted at 80 to the wall 11 of the clutch member 7. A link 81 fastened to the bell crank lever 79 at 82 connects with another bell crank lever 83 at 84. The bell crank lever 83 is pivoted to the wall 11 at 85 and one of the arms thereof is forked at 86 to receive the rounded end 87 of a lever 88 which is pivotally mounted at 89 upon a stud 90 which projects outwardly from the hub 13. The lever 88 projects through a slot 91 provided in the wall 11. The outer extremity 92 of the lever 88 is spherical and located in a position to be engaged by the conical surface 46 of the cam 44 previously described.

By moving the cam 44 toward the right until the spherical end 92 of the lever 88 is located in the groove 47 the lever 88 will be rocked upon its pivot 89 and the motion thereof will be transmitted through the bell crank lever 83, link 81 and bell crank lever 79 to the arm 76 of the cam bar 73 which will be rocked in the direction of the arrow $b$ in Figure 2 causing the clutch ring 16 to grip the clutch member 6 and thereafter cause the clutch members 6 and 7 and driven shaft 3 to rotate in unison but in a reverse direction to the driving shaft 1 and at a reduced speed.

A thin plate 93 is loosely mounted upon the shaft 1 between the clutch members 5 and 6, and the opposite ends of said plate extend into the spaces between the ribs 14 which are occupied by the lugs 17, 18, 66 and 67 for the purpose of preventing the wedge blocks 19 and 68 from becoming dislodged from between their respective ribs and lugs if, for any reason, the screws 22 and 71 become disengaged therefrom.

The general operation of the device briefly stated is as follows:—When it is desired that the motive power to which the driving shaft 1 is connected shall be kept running continuously yet at the same time it is desirable that the driven shaft 3 shall not be rotated, the cam 44 is held in the neutral position illustrated in Figure 1. At this time the clutch member 5 is rotating with the driving shaft and the clutch member 6 is rotating in a reverse direction upon said driving shaft. At this time the clutch rings 15 and 16 are separated a slight distance from their respective clutch members 5 and 6 being expanded into engagement with the inner surface of the ribs 14 as illustrated in Figures 3 and 4.

When, however, it is desired to rotate the driven shaft 3 with the driving shaft 1, the cam 44 is moved toward the left, Figure 1, until the spherical end 43 of the lever 39 is located within the groove 47 of said cam. This will rock the lever 39 and the motion therefrom will be transmitted through the connecting parts to the cam bar 24 which upon being rocked, will cause the clutch ring 15 to frictionally engage the clutch member 5, thereby coupling the clutch members 5 and 7 together, after which the driven shaft 3 will rotate in unison with the driving shaft 1.

When it is desired to reverse the movement of the driven shaft 3, the cam 44 is first thrown into the neutral position illustrated in Figure 1, thereby first disconnecting the clutch members 5 and 7. The movement of the cam 44 is then continued toward the right in Figure 1 until the spherical end 92 of the lever 88 is located within the groove 47. This will rock the lever 88 and the movement therefrom will be transmitted by the connecting parts to the cam bar 73 which, upon being rocked, will cause the clutch ring 16 to frictionally engage the clutch member 6. This will couple the clutch members 6 and 7 together, whereupon the driven shaft 3 will rotate in a reverse direction to the driving shaft 1, and by reason of the reduction in the gearing, will also be rotated at a reduced speed.

While throughout the specification the shaft 1 has been described as a driving shaft and 3 the driven shaft, the device herewith described is interchangeable as it is evident that if it is so desired, the shaft 3 may be the driving shaft and the shaft 1 the driven shaft, and it is evident that such construction falls within the scope of this invention.

I claim:

1. A clutch member having, in combination, a pair of shafts, a pair of clutch members mounted upon one of said shafts, one of said clutch members being fast to said shaft and the other clutch member being loose thereon, means interposed between said last named clutch member and said shaft adapted to rotate said clutch member in a reverse direction upon said shaft, an outer clutch member fast to the other of said shafts and comprising a casing surrounding said first and second named clutch members, a pair of clutch rings, one of said clutch rings being located between said first and second named clutch members and the outer clutch member, means to hold one end of each of said clutch rings in fixed relation to said outer clutch member and means to cause said clutch rings to frictionally engage the clutch member located therein.

2. A clutch member having, in combination, a pair of shafts, a pair of clutch members mounted upon one of said shafts, one of said clutch members being fast to said shaft and the other clutch member being loose thereon, means interposed between said last named clutch member and said shaft adapted to rotate said clutch member in a reverse direction and at a reduced speed upon said shaft, an outer clutch member fast to the other of said shafts and comprising a casing surrounding said first and second named clutch members, a pair of clutch rings, one of said clutch rings being located between said first and second named clutch members and the outer clutch member, means to hold one end of each of said clutch rings in fixed relation to said outer clutch member and means to cause said clutch rings to frictionally engage the clutch member located therein.

3. A clutch member having, in combination, a pair of shafts, a pair of clutch members mounted upon one of said shafts, one of said clutch members being fast to said shaft and the other clutch member being loose thereon, means interposed between said last named clutch member and said shaft adapted to rotate said clutch member in a reverse direction and at a reduced speed upon said shaft, an outer clutch member fast to the other of said shafts and comprising a casing surrounding said first and second named clutch members, a pair of resilient split clutch rings having a normal tendency to expand, one of said clutch rings being located between said first and second named clutch members and the outer clutch member, means to hold one end of each of said clutch rings in fixed relation to said outer clutch member and means to cause said clutch rings to frictionally engage the clutch member located therein.

4. A clutch member having, in combination, a pair of shafts, a pair of clutch members mounted upon one of said shafts, one of said clutch members being fast to said shaft and the other clutch member being loose thereon, means interposed between said last named clutch member and said shaft adapted to rotate said clutch member in a reverse direction and at a reduced speed upon said shaft, an outer clutch member fast to the other of said shafts and comprising a casing surrounding said first and second named clutch members, a pair of clutch rings, one of said clutch rings being located between said first and second named clutch members and the outer clutch member, means to hold one end of each of said clutch rings in fixed relation to said outer clutch member and means supported upon the outer clutch member adapted to vary the location of the fixed end of said clutch rings relatively to said outer member and thereby vary the normal distance between said clutch rings and the clutch member located therein and means to cause said clutch rings to frictionally engage the clutch member located therein.

5. A clutch member having, in combination, a pair of shafts, a pair of clutch members mounted upon one of said shafts, one of said clutch members being fast to said shaft and the other clutch member being loose thereon, means interposed between said last named clutch member and said shaft adapted to rotate said clutch member in a reverse direction upon said shaft, an outer clutch member fast to the other of said shafts and comprising a casing surrounding said first and second named clutch members, and provided with a plurality of radially extending ribs formed integral therewith, a pair of clutch rings provided with outwardly projecting lugs at each end thereof, one of said clutch rings being located between said first and second named clutch members and the outer clutch member, means to hold one end of each of said clutch rings in fixed relation to said outer clutch member, a pair of cam bars, one of said cam bars being loosely interposed between the lug at the other end of each of said clutch rings and one of the ribs of the outer clutch member and means to rock either of said cam bars to move the adjacent end of said clutch rings to force said rings into frictional engagement with the clutch member located therein.

6. A clutch member having, in combination, a pair of shafts, a pair of clutch members mounted upon one of said shafts, one of said clutch members being fast to said shaft and the other clutch member being loose thereon, means interposed between said last named clutch member and said shaft adapted to rotate said clutch member in a reverse direction upon said shaft, an outer clutch member fast to the other of said shafts and comprising a casing surrounding said first and second named clutch members, a pair of clutch rings, one of said clutch rings being located between said first and second named clutch members and the outer clutch member, means to hold one end of each of said clutch rings in fixed relation to said outer clutch member, a plurality of cam bars, one of said cam bars being interposed between the other end of each of said clutch rings and the outer clutch member, an arm extending from each of said cam bars, bell crank levers mounted upon the interior of said outer clutch member adapted to engage said arms to rock said cam bars to move the adjacent end of said clutch rings into frictional engagement with said clutch members and means to rock said bell crank levers.

7. A clutch member having, in combination, a pair of shafts, a pair of clutch members mounted upon one of said shafts, one of said clutch members being fast to said shaft and the other clutch member being loose thereon, means interposed between said last named clutch member and said shaft adapted to rotate said clutch member in a reverse direction upon said shaft, an outer clutch member fast to the other of said shafts and comprising a casing surrounding said first and second named clutch members, a pair of clutch rings, one of said clutch rings being located between said first and second named clutch members and the outer clutch member, means to hold one end of each of said clutch rings in fixed relation to said outer clutch member, a plurality of cam bars, one of said cam bars being interposed between the other end of each of said clutch rings and the outer clutch member, an arm extending from each of said cam bars, two pairs of bell crank levers mounted upon the interior of said outer clutch member, a link connecting the bell crank levers of each pair, a pair of levers mounted upon the exterior of said outer clutch member and projecting into the interior thereof, each of said last named levers being operatively connected with one of said pair of bell crank levers, and means to rock said exterior levers.

8. A clutch member having, in combination, a pair of shafts, a pair of clutch members mounted upon one of said shafts, one of said clutch members being fast to said shaft and the other clutch member being loose thereon, means interposed between said last named clutch member and said shaft adapted to rotate said clutch member in a reverse direction upon said shaft, an outer clutch member fast to the other of said shafts and comprising a casing surrounding said first and second named clutch members, a pair of clutch rings, one of said clutch rings being located between said first and second named clutch members and the outer clutch member, means to hold one end of each of said clutch rings in fixed relation to said outer clutch member, a plurality of cam bars, one of said cam bars being interposed between the other end of each of said clutch rings and the outer clutch member, an arm extending from each of said cam bars, two pair of bell crank levers mounted upon the interior of said outer clutch member, a link connecting the bell crank levers of each pair, a pair of levers mounted upon the exterior of said outer clutch member and projecting into the interior thereof, each of said last named levers being operatively connected with one of said pair of bell crank levers, and a cam slidably mounted upon one of said shafts adapted to move longitudinally into engagement with either of said exterior levers to rock the same and thereby cause said clutch rings to frictionally engage the clutch member located therein.

9. A clutch member having, in combination, a pair of shafts, a pair of clutch members mounted upon one of said shafts, one of said clutch members being fast to said shaft and the other clutch member being loose thereon, means interposed between said last named clutch member and said shaft adapted to rotate said clutch member in a reverse direction and at a reduced speed upon said shaft, said means embodying therein an internal gear fast to said last named clutch member, a gear fast to said last named shaft and a plurality of intermediate gears interposed between and meshing with said first and second named gears, said intermediate gears being mounted independently of said clutch member, an outer clutch member fast to the other of said shafts and comprising a casing surrounding said first and second named clutch members, a pair of clutch rings, one of said clutch rings being located between said first and second named clutch members and the outer clutch member, means to hold one end of each of said clutch rings in fixed relation to said outer clutch member and means to cause said clutch rings to frictionally engage the clutch member located therein.

10. A clutch member having, in combination, a pair of shafts, a pair of clutch members mounted upon one of said shafts, one of said clutch members being fast to said shaft and the other clutch member being loose thereon, means interposed between said last named clutch member and said shaft adapted to rotate said clutch member in a reverse direction upon said shaft, an outer clutch member fast to the other of said shafts and comprising a casing surrounding said first and second named clutch members, and concentrically arranged relatively thereto, a bearing ring fast to said casing, a bearing member loosely mounted upon the shaft with said first named clutch members, means to prevent the rotation of said bearing member upon said shaft, a plurality of anti-friction members located between said bearing ring and said bearing member, a pair of clutch rings, one of said clutch rings being located between said first and second named clutch members and the outer clutch member, means to hold one end of each of said clutch rings in fixed relation to said outer clutch member and means to cause said clutch rings to frictionally engage the clutch member located therein.

11. A clutch member having, in combination, a pair of shafts, a pair of clutch members mounted upon one of said shafts, one of said clutch members being fast to said shaft and the other clutch member being loose thereon, means interposed between said last named clutch member and said shaft adapted to rotate said clutch member in a reverse direction and at a reduced speed upon said shaft, an outer clutch member fast to the other of said shafts and comprising a casing surrounding said first and second named clutch members and provided with a plurality of radially extending ribs, and concentrically arranged relatively thereto, a pair of resilient split clutch rings provided with outwardly projecting lugs at each end thereof, one of said clutch rings being located between each of said first and second named clutch members and the outer clutch member and having a normal tendency to expand into engagement with the ribs of said outer clutch member, means to hold one end of each of said clutch rings in fixed relation to said outer clutch member, wedge blocks adjustably mounted upon said outer clutch member adapted to vary the location of the fixed end of said clutch rings relatively to said outer clutch member and thereby vary the normal distance between said clutch rings and the clutch member located therein, a plurality of cam bars, one of said cam bars being loosely interposed between the other end of each of said clutch rings and one of the ribs of the outer clutch member, and means to rock either of said cam bars to move the adjacent end of said clutch rings to force said rings into frictional engagement with the clutch member located therein.

In testimony whereof I have hereunto set my hand in presence of two subscribing witnesses.

RUDOLPH PINDER.

Witnesses:
 FRANKLIN E. LOW,
 CHARLES S. GOODING.